FIP8212 UR 3,873,827
250/201

United States Patent [19]

Krause

[11] 3,873,827

[45] Mar. 25, 1975

[54] CIRCUIT ARRANGEMENT FOR EXPOSURE MEASURING DEVICES

[75] Inventor: Gerhard Krause, Ebersberg, Germany

[73] Assignee: Siemens Aktiengesellschaft, Berlin and Munich, Germany

[22] Filed: Mar. 2, 1973

[21] Appl. No.: 337,768

[30] Foreign Application Priority Data

Apr. 12, 1972 Germany............................ 2217659

[52] U.S. Cl. ............. 250/201, 250/229, 250/214 P, 354/60

[51] Int. Cl. ............................................. G01j 1/20

[58] Field of Search ................ 250/214 P, 229, 201; 350/160 LC; 95/64 D; 354/60; 210/204; 330/109

[56] References Cited

UNITED STATES PATENTS

| | | | |
|---|---|---|---|
| 3,116,673 | 1/1964 | Bogopolsky | 250/229 X |
| 3,424,908 | 1/1969 | Sitter | 250/212 X |
| 3,605,030 | 9/1971 | Elmore | 330/109 X |
| 3,670,184 | 6/1972 | Idei | 250/214 P X |
| 3,677,151 | 7/1972 | Werner et al. | 354/60 |
| 3,723,651 | 3/1973 | Gorog | 350/160 LC X |
| 3,778,722 | 12/1973 | Stein | 330/109 X |

*Primary Examiner*—Walter Stolwein
*Attorney, Agent, or Firm*—Hill, Gross, Simpson, Van Santen, Steadman, Chiara & Simpson

[57] ABSTRACT

A circuit arrangement for exposure measuring devices having a photo detector for measuring the light conditions and a variable light screen arranged ahead of the photo detector.

The arrangement includes an amplifier having a high pass characteristic or a band pass characteristic and amplifies signals greater than a predetermined frequency at a factor of about 10,000 times greater than signals below that frequency, and includes means for changing the light transmission of the variable light screen from one amount to another with a transient time that is shorter than the time utilized in measuring an exposure.

20 Claims, 2 Drawing Figures

CIRCUIT ARRANGEMENT FOR EXPOSURE MEASURING DEVICES

BACKGROUND OF THE INVENTION

1. Field of the Invention

This Invention relates to exposure measuring devices, and is more particularly concerned with a circuit arrangement for exposure measuring devices, such as exposure meters or automatic exposure systems for cameras, comprising a photo detector for measuring the light conditions.

2. Description of the Prior Art

It is possible with a circuit of the above-mentioned type to measure the exposure time required for given light conditions, and to indicate such times, or to directly automatically adjust the required exposure time or the required aperture position, respectively. The photo detector for measuring the light conditions can therefore be arranged in a beam path which is entirely separate from the main beam path of the camera.

In designing exposure measuring circuits, it is essential that, on one hand, the exposure strengths available for the photo detector be very small (for example approximately $10^{-2}$ Lux) and that, on the other hand, temperature influences do not result in any intolerable measuring errors.

If the photo detector is operated as a photo diode, the useful signal currents having exposure strengths which can be considered, are in the order of picoamperes. On the other hand, the dark current is provided before measurement is in the order of nanoamperes at a temperature of 60°C and a blocking voltage of 1 volt. For this reason, a direct evaluation of the diode current is excluded in a blocked voltage operation. Even with circuit arrangements for compensating the dark current, this problem cannot be solved with such extensive current ratios.

If the photo detector is operated as a photo element, remarkable flux currents flow even with small biases in the flow direction and this factor must be taken into account. This flux current subtracts from the photo current caused by the photons, and therefore renders the measurement inaccurate.

SUMMARY OF THE INVENTION

This invention has as its primary object the provision of a circuit arrangement for exposure measuring devices whereby light measurements are possible with photo diodes, even with very small exposure strengths. The above object is achieved, according to this invention, in an exposure measuring device of the initially mentioned kind, in such a way that a variable light screen is arranged in the beam path in front of the photo detector, and that the photo detector is connected to the input of an amplifier having a high pass characteristic or a band pass characteristic, and that the transparency of the variable light screen changes from a first amount to a second amount at the beginning of the measurement, and that the transit time from the first amount to the second amount is shorter than the measuring time.

BRIEF DESCRIPTION OF THE DRAWING

Other objects, features and advantages of the invention, its organization, construction and operation will be best understood from the following description taken in conjunction with the accompanying drawing, on which.

DESCRIPTION OF THE PREFERRED EMBODIMENTS

Figure 1:
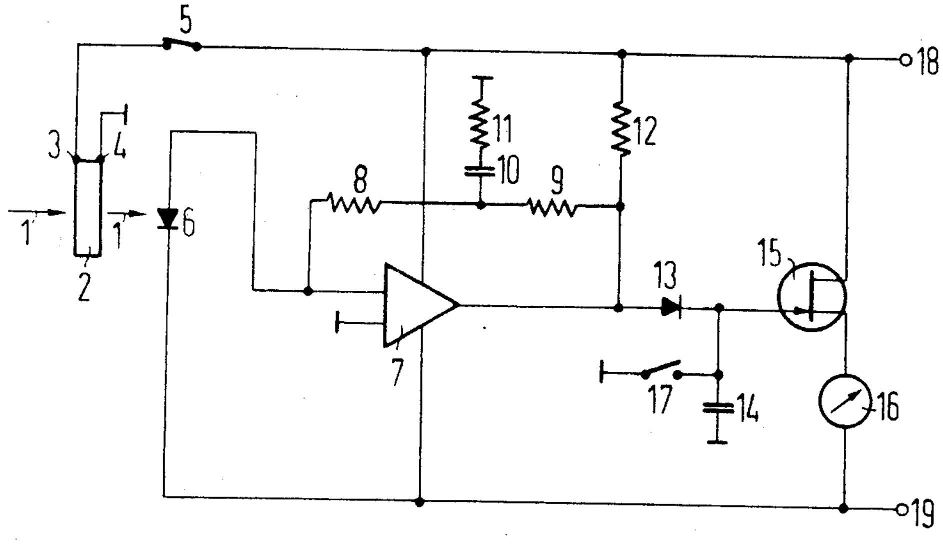
FIG. 1 is a schematic circuit diagram of an embodiment of the invention.

Referring to FIG. 1, an exposure measuring device is illustrated in which a light beam reaches a photo diode 6 by way of an electronically controllable light screen 2. The light screen 2 can, for example, be an arrangement including a liquid crystal cell. A voltage is applied to the electrodes 3, 4 of the variable light screen 2 by way of a switch 5. Therefore, the transparency of the light screen will be increased. The photo current of the photo diode 6 is extended to the inverted input of an operational amplifier 7 which has its other input connected to ground.

A feedback network is formed between the output and the inverted input of the operational amplifier 7 and comprises three resistors 8, 9 and 11 and a capacitor 10 and causes the transmission factor of the operational amplifier to be essentially smaller for lower frequencies than for higher frequencies. A resistor 12 is connected between the output of the operational amplifier and the positive terminal 18 of an electrical supply, such as a battery. The resistor 12 is the operational load resistor for the operational amplifier 7. A diode 13 is connected to the output of the operational amplifier 7 and is conductive only when the voltage at the output of the operational amplifier is more positive than the voltage at the upper terminal of a memory capacitor 14. The voltage across the memory capacitor 14 will reach the indicating instrument or meter by way of a power amplifying field effect transistor 15 which is connected in series with the instrument 16. The exposure strength can be read from the scales of the instrument 16. The memory capacitor 14 will be discharged by means of a switch 17 connected across the capacitor 14 before the next measurement. The positive operational voltage, with respect to ground, is, as indicated above, provided at the terminal 18, and the negative operational voltage is provided at the terminal 19.

The circuit described above operates as follows: The dark current of the photo diode 6 and possibly the photo current from the light which still passes the variable light screen when the light screen is in the state of less transparency, will find little amplification due to the strong feedback connection of the amplifier 7. The voltage transfer factor in ths situation is approximately one. The jump of the photo diode current, which occurs when the transparency of the variable light screen 2 is suddenly enlarged upon operation of the switch 5, however, is amplified to a much greater extent. It should be pointed out that due to the transverse elements 10 and 11 in the feedback network, the amplification is essentially greater for high frequencies than the lower frequencies. In a particular circuit, the transfer factor is approximately 10,000 for high frequencies.

The boundary frequency of the high pass amplifier embodied in this manner is approximately $$fg_1 = 1/2\ \pi \cdot 10T_1$$

where $T_1$ is the longest exposure measuring time. $T_1$ will thereby be at 0.1 seconds for hand exposure meters. In automatic exposure systems in cameras, $T_1$ may amount up to 50 seconds.

The peak value of the voltage jump occurring at the output of the operational amplifier is stored in the memory capacitor 14. A resistor may be inserted in series with the diode 13, causing a mean value formation, while the memory capacitor 14 is charged, and will therefore lower the interfering influence of noise. The same results will be obtained when the amplifier comprises a band pass characteristic. For this purpose, the amplifying factor is lowered for high frequencies, for example by means of a capacitor connected between the output and the inverted input of the operational amplifier. This upper boundary frequency is approximately $$fg_2 = 1/2\ \pi \cdot {}^{0.1}\ T_2$$

where $T_2$ is the shortest measuring time.

The exposure measuring device according to the present invention therefore has the advantage that the dark current of the photo diode and the input current of the amplifier do not disturb, but that the useful signal and thus the exposure strength is measured error free, even if the useful signal is much smaller than the aforementioned interference currents. In the abovementioned exposure measuring devices, the interference signal must be compensated under these conditions. Since, however, the dark current, in particular, is strongly temperature dependent, this technique will only be successful with relatively great exposure strengths. It is also a drawback that a balancing or equalization process is required for adjusting the compensation. All these drawbacks and limitations are not found in an arrangement constructed in accordance with the present invention.

Figure 2:
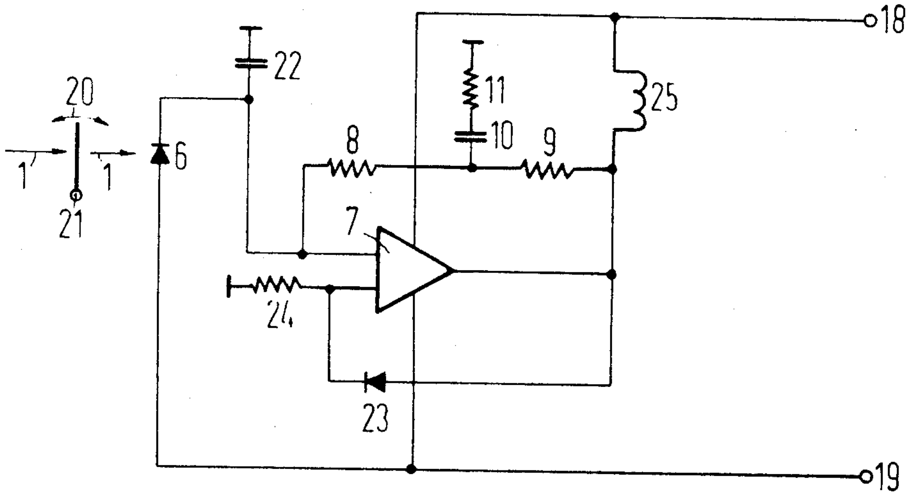
FIG. 2 is another schematic circuit diagram of another embodiment of the invention.

With the arrangement according to FIG. 2, a mechanically moved light screen 20 is utilized. This light screen 20 will be rotated away from the beam path, about the pivot point 21, in the direction of the double headed arrow at the beginning of the measuring time; the time required for this purpose being approximately 1 millisecond. An integration capacitor 22 is charged due to the dark current of the diode 6 and the amplifier 7 to an unkown voltage value. If now the light beam strikes the photo diode 6, after the light screen 20 has been rotated away, the voltage of the integration capacitor 22 changes linearly with respect to time. The increase speed is proportional to the exposure strength. With small exposure strengths, the entire voltage rise during the measuring time is much smaller than the above-mentioned unknown interference voltage. The amplifier 7 with the feedback network 8–11 has now again the property of a large transmission factor for the changing component of the voltage, but a transmission factor which is several powers of ten smaller for voltages which are constant with respect to time. Therefore, the useful signal can be separated from the interference signal.

If the amplified useful signal exceeds the threshold voltage of a diode 23 connected between the output of the amplifier and the noninverted input, the output signal will reach the noninverted input of the amplifier 7. In this case, a positive feedback will occur which will cause the output voltage of the amplifier 7 to jump to almost the value of the positive operational voltage in a very short period of time. A coil of an attracting magnet 25 is connected between the positive electrical supply terminal 18 and the output of the operational amplifier 7. This coil will therefore become free of current. The armature of the magnet 25 will decrease and finally close the aperture of the camera and will therefore terminate the exposure time of the camera.

The arrangement according to FIG. 2, after useful signal changes, can also be used for indicating exposure measuring devices, instead of for the direct exposure time control of cameras. For this purpose, a start-stop oscillator will be started at the beginning of the measurement. The oscillations of the oscillator are counted by means of an electronic counter. After a time dependent on the strength of the exposure, the output voltage of the amplifier 7 will here also jump to a positive value. The oscillator will be stopped in response to this positive voltage jump. The counted result is proportional to the required exposure time or, in other words, it is proportional to the exposure strength. The arrangements described above may be combined. The signal jump may, for example, be integrated similarly as with the arrangement according to FIG. 2. However, no threshold value switch will be utilized. For this purpose, the output voltage of the operational amplifier 7 will be transmitted after a predetermined after the measurement has been started into a memory capacitor. The memory, for example, may be constructed as in the arrangement according to FIG. 1. The diode 13, however, would be replaced by an electronic switch.

A logarithmic indication of the exposure strength can be obtained after a nonlinear amplifier is connected into the signal path, after the amplifier 7.

Although I have described my invention by refrence to specific illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for exposure measuring devices, comprising: a photodetector for receiving light from an incident light beam path and operable for an exposure measuring time to measure and provide signals indicative of light conditions; a variable light screen disposed in front of said photo detector in the incident light beam path; a high pass amplifier connected to said photo detector to receive said signals; and means for changing the light transmission at said variable light screen from a first amount to a second amount and with a transient time between said two amounts that is shorter than the exposure measuring time.

2. A circuit arrangement according to claim 1 wherein said amplifier includes means defining a pass characteristic which amplifies signals greater than a predetermined frequency at a factor of about 10,000 times greater than signals below that frequency.

3. A circuit arrangement according to claim 1, comprising a memory for storing the peak value of signals at the output of said amplifier.

4. A circuit arrangement according to claim 1 wherein said photo detector responds with a signal jump as the transparency of said variable light screen changes from said first amount to said second amount, and comprising an integrator for integrating said signal jump and a memory for storing the integrated value.

5. A circuit arrangement according to claim 1, wherein said variable light screen comprises an electrically controlled transparency element.

6. A circuit arrangement according to claim 5, wherein said variable light screen includes an electrically controlled liquid crystal cell.

7. A circuit arranagement according to claim 1, wherein said photo detector comprises a photo diode operated with a blocking voltage.

8. A circuit arrangement according to claim 1 wherein said photo detector comprises a photo transistor operated with a blocking voltage.

9. A circuit arrangement for exposure measuring devices, comprising: a photo detector for receiving light from an incident light beam path and operable for an exposure measuring time to measure and provide signals indicative of light conditions; a variable light screen disposed in front of said photo detector in the incident light beam path; a band pass amplifier connected to said photo detector to receive said signals; and means for changing the light transmission at said variabale light screen from a first amount to a second amount and with a transient time between said two amounts that is shorter than the exposure measuring time.

10. A circuit arrangement according to claim 9 wherein said amplifier includes means defining a pass characteristic which amplifies signals greater than a predetermined frequency at a factor of about 10,000 times greater than signals below that frequency.

11. A circuit arrangement according to claim 9, comprising a memory for storing the peak value of signals at the output of said amplifier.

12. A circuit arrangement according to claim 9 wherein said photo detector responds with a signal jump as the transparency of said variable light screen changes from said first amount to said second amount, and comprising an integrator for integrating said signal jump and a memory for storing the integrated value.

13. A circuit arrangement according to claim 9, wherein said variable light screen comprises an electrically controlled transparency element.

14. A circuit arrangement according to claim 13, wherein said variable light screen includes an electrically liquid crystal cell.

15. A circuit arrangement according to claim 9, wherein said photo detector comprises a photo diode operated with a blocking voltage.

16. A circuit arrangement according to claim 9, wherein said photo detector comprises a photo transistor operated with a blocking voltage.

17. A circuit arrangement for exposure measuring devices, comprising: a photo detector for receiving light from an incident light beam path and operable for an exposure measuring time to measure and provide signals indicative of light conditions; a variable light screen disposed in front of said photo detector and the incident light beam path; a high pass amplifier connected to said photo detector to receive said signal; and means for changing the light transmission at said variable light screen from a first amount to a second amount and with a transient time between said two amounts that is shorter than the exposure measuring time and including means for operating said changing means at the beginning of an exposure measurement.

18. A circuit arrangement for exposure measuring devices, comprising: a photo detector for receiving light from an incident light beam path and operable for an exposure measuring time to measure and provide signals indicative of light conditions; a variable light screen disposed in front of said photo detector in the incident light beam path; a high pass amplifier connected to said photo detector to receive said signal; and means for changing the light transmission at said variable light screen from a first amount to a second amount and with a transient time between said two amounts that is shorter than the exposure measuring time, including means for rendering the transient time to be less than 10 percent of the longest measuring time.

19. A circuit arrangement for exposure measuring devices, comprising: a photo detector for receiving light frm an incident light beam path and operable for an exposure measuring time to measure and provide signals indicative of light conditions; a variable light screen disposed in front of said photo detector in the incident light beam path; a band pass amplifier connected to said photo detector to receive said signals; and means for changing the light transmission at said variable light screen from a first amount to a second amount and with a transient time between said two amounts that is shorter than the exposure measuring time, said means for changing the light transmission including means for operating said means at the beginning of an exposure measurement.

20. A circuit arrangement for exposure measuring devices, comprising: a photo detector for receiving light from an incident light beam path and operable for an exposure measuring time to measure and provide signals indicative of light conditions; a variable light screen disposed in front of said photo detector in the incident light beam path; a band pass amplifier connected to said photo detector to receive said signa; and means for changing the light transmission at said variable light screen from a first amount to a second amount and with a transient time between said two amounts that is shorter than the exposure measuring time, said means for changing the light transmission at said variable light screen including means for rendering the transient time to be less than 10 percent of the longest measuring time.

* * * * *